(12) United States Patent
Kim et al.

(10) Patent No.: US 11,067,130 B2
(45) Date of Patent: Jul. 20, 2021

(54) WHEEL BEARING SEALING DEVICE

(71) Applicant: ILJIN GLOBAL CO., LTD, Seoul (KR)

(72) Inventors: Yong Won Kim, Seoul (KR); Jong Moon Park, Seoul (KR)

(73) Assignee: ILJIN GLOBAL CO., LTD, Seoul (KR)

( * ) Notice: Subject to any disclaimer, the term of this patent is extended or adjusted under 35 U.S.C. 154(b) by 0 days.

(21) Appl. No.: 16/736,174

(22) Filed: Jan. 7, 2020

(65) Prior Publication Data

US 2020/0141448 A1 May 7, 2020

Related U.S. Application Data

(63) Continuation of application No. PCT/KR2017/012947, filed on Nov. 15, 2017.

(30) Foreign Application Priority Data

Jul. 7, 2017 (KR) .......................... 10-2017-0086292

(51) Int. Cl.
*F16C 33/80* (2006.01)
*F16C 33/78* (2006.01)

(52) U.S. Cl.
CPC .......... *F16C 33/80* (2013.01); *F16C 33/7823* (2013.01); *F16C 33/7883* (2013.01); *F16C 2326/02* (2013.01)

(58) Field of Classification Search
CPC .... F16C 33/78; F16C 33/782; F16C 33/7823; F16C 33/7879; F16C 33/7883; F16C 33/80; F16C 33/805
See application file for complete search history.

(56) References Cited

U.S. PATENT DOCUMENTS 9,358,833 B2 * 6/2016 Gulli ....................... F16C 33/76

FOREIGN PATENT DOCUMENTS

| DE | 102008017409 | * 10/2009 |
| JP | H07010630 U | 2/1995 |
| JP | 2004084942 A | 3/2004 |
| JP | 2008256163 A | 10/2008 |
| JP | 2014109330 A | 6/2014 |
| KR | 1020100111270 A | 10/2010 |

OTHER PUBLICATIONS

International Search Report for PCT/KR2017/012947 dated Apr. 5, 2018.

* cited by examiner

*Primary Examiner* — James Pilkington
(74) *Attorney, Agent, or Firm* — Dinsmore & Shohl LLP; Yongsok Choi, Esq.

(57) ABSTRACT

A sealing device comprises a first insert body and a second insert body. The first insert body has an annular first frame, and a first sealing part coupled to the first frame. The second insert body has an annular second frame having a diameter smaller than that of the first frame, and a second sealing part coupled to the second frame. The second insert body rotates relative to the first insert body. The first insert body and the second insert body are arranged such that a gap is formed between the first sealing part and the second sealing part. The second sealing part has a first surface facing the first sealing part and spaced apart from the second frame in a first axial direction; and a first baffle protruding toward the first sealing part from the end of the first surface in the outer radial direction thereof.

18 Claims, 7 Drawing Sheets

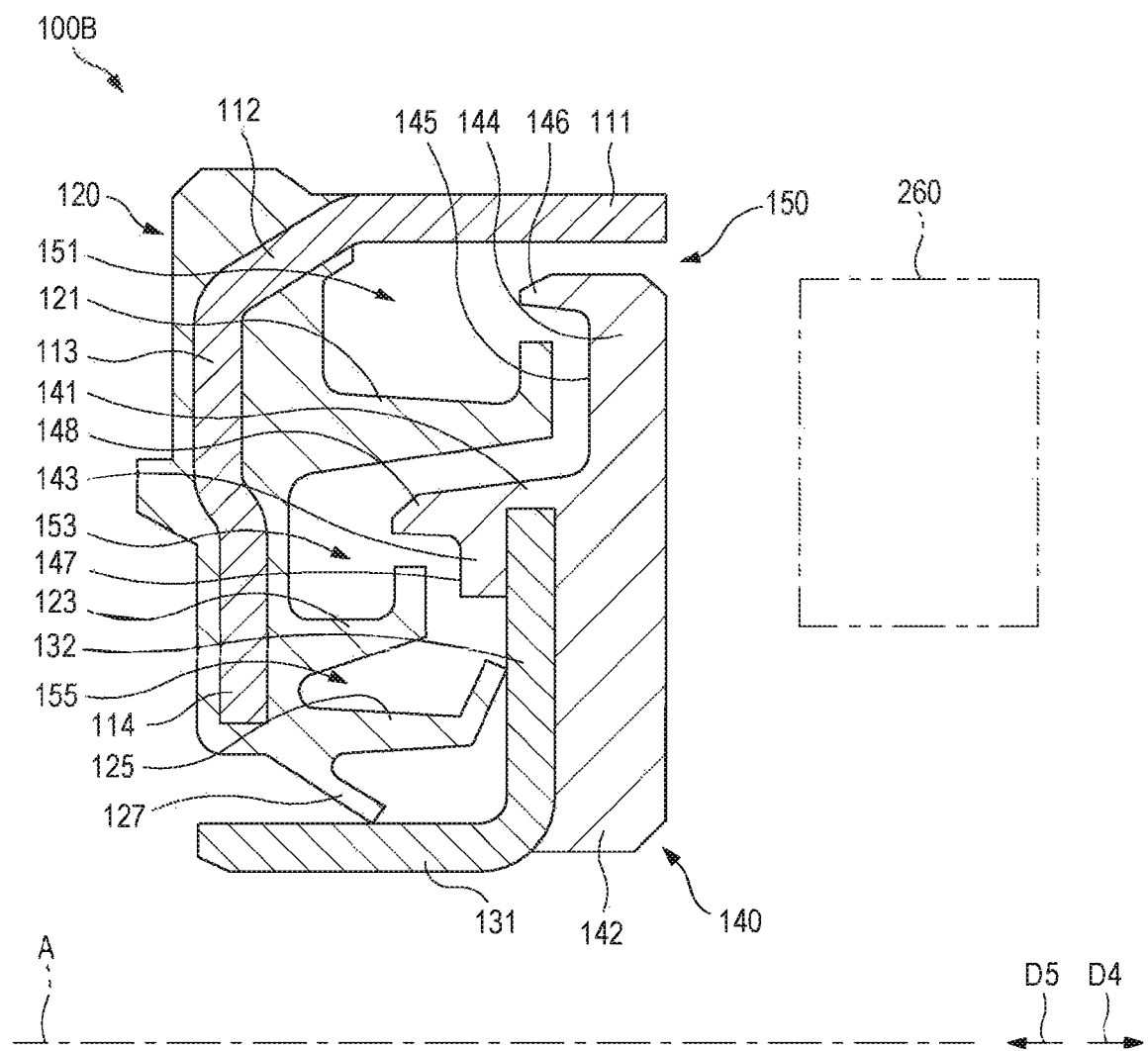

WHEEL BEARING SEALING DEVICE

CROSS REFERENCE TO RELATED APPLICATIONS

This application is a continuation of International Application No. PCT/KR2017/012947 filed on Nov. 15, 2017, claiming priority to Korean Patent Application No. 10-2017-0086292 filed on Jul. 7, 2017, the entire contents of which are herein incorporated by reference.

TECHNICAL FIELD

Embodiments of the present disclosure relate to a sealing device used in a wheel bearing.

BACKGROUND ART

A chassis of a vehicle comprises a wheel bearing coupled to a wheel of the vehicle. The wheel bearing may comprise an outer ring coupled to a portion of the chassis, a wheel hub coupled to a drive axle or a driven axle, and a plurality of rolling elements arranged between the outer ring and the Wheel hub. Owing to the use environment of the wheel bearing, foreign materials such as rainwater, sewage, and the like may infiltrate into an interior of the wheel bearing through a gap formed between the outer ring and the wheel hub. Since such foreign materials degrade operability and durability of the wheel bearing, a sealing device for sealing the gap between the outer ring and the wheel hub is provided in the wheel bearing.

A wheel bearing sealing device is fitted into the gap between the outer ring and the wheel hub. For example, a wheel bearing sealing device comprises an insert body for an outer ring, which is formed in an annular shape, an insert body for a wheel hub, which is formed in an annular shape, and a sealing part coupled to the insert body for an outer ring. The insert body for an outer ring is fitted into the outer ring of the wheel bearing. The insert body for a wheel hub is fitted on the wheel hub of the wheel bearing and rotated relative to the outer ring.

SUMMARY

Technical Problem

According to the conventional wheel bearing sealing device, the sealing part coupled to the insert body for an outer ring comprises an annular rubber lip for sealing action. The lip protrudes toward the insert body for a wheel hub and comes into contact with a surface of the insert body for a wheel hub. Since the insert body for a wheel hub is rotated relative to the insert body for an outer ring, the lip rubs along the surface of the insert body for a wheel hub in a state of coming into contact with the surface of the insert body for a wheel hub.

Since the contact and the rubbing between the lip and the insert body for a wheel hub act as resistance with respect to a relative rotation between the outer ring and the wheel hub, the conventional wheel bearing sealing device reduces the driving force transmitted from the axle to the wheels. Further, since the rubbing between the lip and the insert body for a wheel hub abrades the lip, the conventional wheel bearing sealing device causes degradation in sealing performance due to the abrasion of the lip. Further, since the conventional wheel bearing sealing device has only a structure in which the lip blocks a gap between the insert bodies, infiltration amount of foreign materials cannot be minimized or infiltration of the foreign materials cannot be delayed, and thus the conventional wheel bearing sealing device merely provides limited sealing performance.

Embodiments disclosed herein solve the above-described problems of the prior art. Embodiments disclosed herein provide a wheel hearing sealing device configured to prevent portions for blocking foreign materials from rubbing. Further, embodiments disclosed herein provide a wheel bearing sealing device configured to gradationally block foreign materials and minimize an infiltration amount of the foreign materials.

Technical Solution

Embodiments of the present disclosure relate to a wheel bearing sealing device. The wheel bearing sealing device according to one embodiment may comprise a first insert body and a second insert body. The first insert body may comprise an annular first frame and a first sealing part coupled to the first frame. The second insert body may comprise an annular second frame having a diameter that is smaller than that of the first frame and a second sealing part coupled to the second frame. The second insert body may rotate relative to the first insert body. The first insert body and the second insert body may be arranged such that a gap is formed between the first sealing part and the second sealing part. The second sealing part may comprise a first surface facing the first sealing part and spaced apart from the second frame in a first axial direction; and a first baffle protruding from an end of the first surface in a radially outward direction toward the first sealing part. A first cavity may be formed in a gap by the first sealing part and the first baffle. At least a portion of a first cavity passage connected to the first cavity may be formed in the gap by the first part, the first baffle, and the first surface.

In one embodiment, the second sealing part may comprise a second surface facing first sealing part and spaced apart from the first surface in a second axial direction opposite to the first axial direction; and a second baffle protruding from an end of the second surface in the radially outward direction toward the first sealing part. A second cavity may be formed in the gap by the first sealing part and the second baffle. At least a portion of a second cavity passage connected to the second cavity may be formed in the gap by the first sealing part, the second baffle, and the second surface.

In one embodiment, a volume of the first cavity may be larger than that of the second cavity.

In one embodiment, the first cavity passage and the second cavity passage may have a cross-sectional shape which is bent with respect to a rotation axis of the second insert body.

In one embodiment, the first sealing part may comprise an annular first lip protruding toward the second sealing part and configured to partially define the first cavity, and the first cavity passage may be formed in the gap by the first lip and the second sealing part.

In one embodiment, the first lip may comprise an annular first lip baffle configured to partially define the first cavity, and the first lip baffle may protrude perpendicular to the rotation axis of the second insert body.

In one embodiment, a free end of the first baffle may be spaced apart from the first lip baffle in the radially outward direction.

In one embodiment, the first sealing part may comprise a second lip protruding toward the second sealing part, and the second lip may be spaced from the first lip in the radially inward direction to partially define the second cavity.

In one embodiment, the second lip may comprise an annular second lip baffle configured to partially define the second cavity, and the second lip baffle may protrude perpendicular to the rotation axis of the second insert body.

In one embodiment, a free end of the second baffle may be spaced apart from the second lip baffle in the radially outward direction.

In one embodiment, a third cavity connected to the second cavity through the second cavity passage may be formed in the gap. The first sealing part may comprise a third lip spaced apart from the second lip in the radially inward direction, protruding toward the second sealing part, and configured to partially define the third cavity. The third lip may be in contact with the second insert body.

In one embodiment, a third cavity may be formed in the gap by the first sealing part and the second sealing part, and a third cavity passage connected to the third cavity may be formed in the gap by the first sealing part, the second sealing part, and the second frame.

In one embodiment, the first sealing part may comprise a third lip protruding toward the second sealing part, and the third lip may be spaced from the second lip in the radially inward direction to partially define the third cavity.

In one embodiment, the third lip may comprise an annular third lip baffle configured to partially define the third cavity, and the third lip baffle may protrude perpendicular to the rotation axis of the second insert body.

In one embodiment, the first sealing part may comprise a grease lip in contact with an outer circumferential surface of the second frame. The third lip and the grease lip may partially define a fourth cavity communicating with the third cavity. The fourth cavity may have an annular shape.

In one embodiment, the first cavity, the second cavity, and the third cavity may be arranged at different positions along the rotation axis of the second insert body in the radially inward direction.

In one embodiment, the first cavity passage, the second cavity passage, and the third cavity passage may have a cross-sectional shape which is bent with respect to the rotation axis of the second insert body.

In one embodiment, the first sealing part may have a plurality of grooves on the surface facing the first cavity or the surface facing the second cavity, and the plurality of grooves may have an annular shape based on the rotation axis and may be spaced apart from each other.

Advantageous Effects

The wheel bearing sealing device according to one embodiment is configured such that the first sealing part does not come in contact with the second sealing part, thereby removing or reducing friction between portions for blocking foreign materials. Further, in accordance with the wheel bearing sealing device according to one embodiment, the first sealing part and the second sealing part can define an improved labyrinth-shaped gap therebetween for preventing infiltration of foreign materials, and thus it is possible to slow down infiltration rates of foreign materials as much as possible and to prevent infiltration of the foreign materials. Further, in accordance with the wheel bearing sealing device according to one embodiment, the labyrinth-shaped gap is configured to have a plurality of cavities such that foreign materials can be gradationally blocked by the cavities and an infiltration amount of the foreign materials can be minimized. Therefore, the wheel bearing sealing device according to one embodiment may have improved sealing performance.

DESCRIPTION OF DRAWINGS

FIG. 7 illustrates a cross-sectional structure of a wheel bearing sealing device according to still another embodiment and a schematic structure of a sensor installed in a wheel bearing.

DETAILED DESCRIPTION

Figure 1:
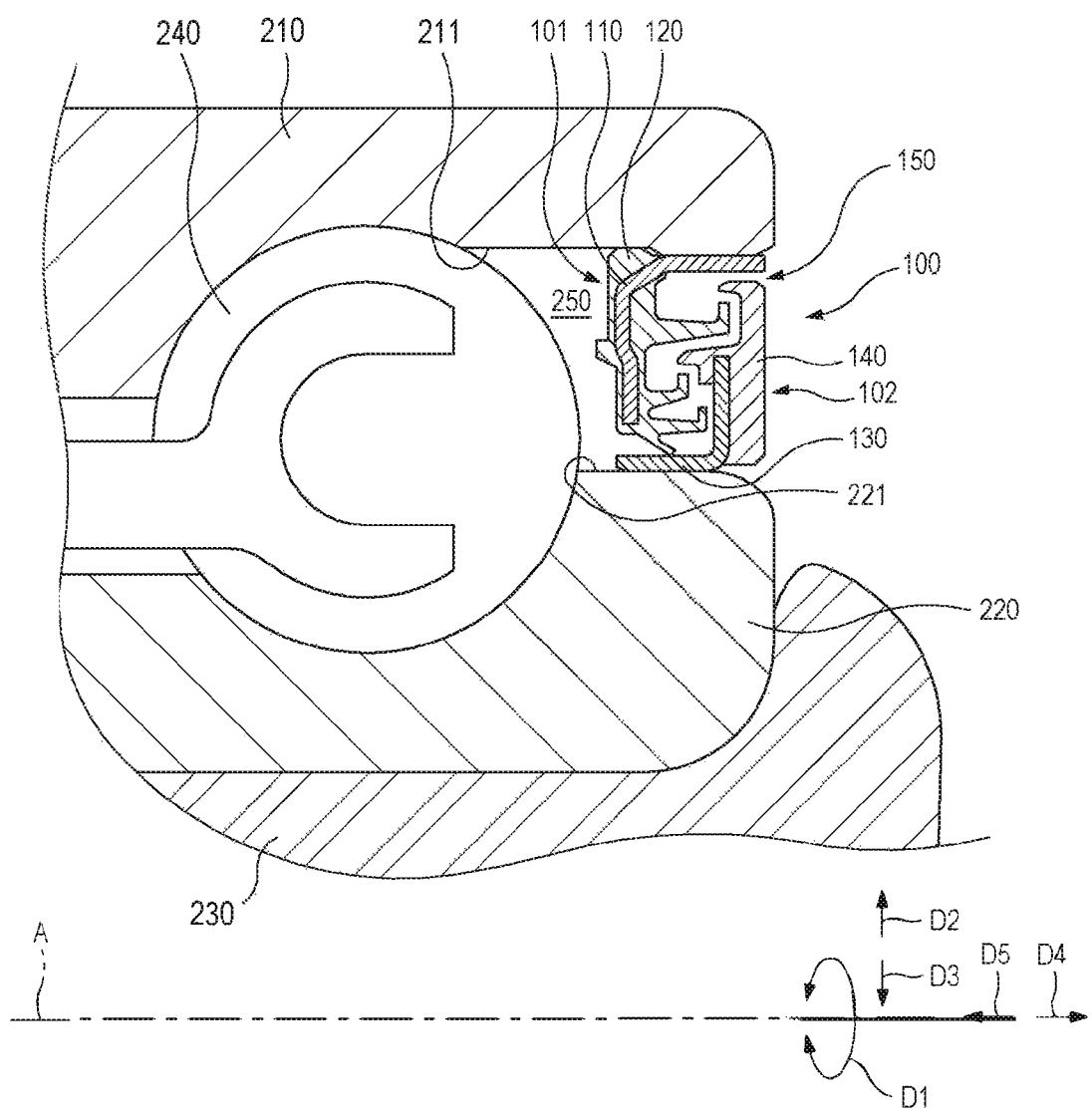
FIG. 1 is a cross-sectional view illustrating a wheel bearing sealing device according to one embodiment coupled to an example of a wheel bearing.

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising," "including," "having," "taking," and the like used herein should be construed as open-ended terms encompassing the possibility of including other embodiments.

The singular form described herein may include the plural form unless the context clearly dictates otherwise, and this is equally applied to the singular form set forth in the claims.

Terms a "first," a "second," and the like are used to distinguish a plurality of components, and the order or importance of corresponding components is not limited by these terms.

Throughout the present disclosure, when a component is referred to as being "connected" or "coupled" to another component, the component can be directly connected or coupled to another component, or can be connected or coupled to another component by intervening yet another component therebetween.

A directional directive of a "radially outward direction" used herein means a direction away from an axis in a radial direction with respect to the axis of a rotating body, and a directional directive of a "radially inward direction" means a direction opposite the radially outward direction. Further, a directional directive of a "first axial direction" used in the present disclosure means a direction along a rotation axis of a rotating body, and a directional directive of a "second axial direction" means a direction opposite to a first axial direction along the rotation axis. The first axial direction may be a direction from a wheel toward an interior of a chassis or from the chassis toward the wheel along the rotation axis. A wheel bearing sealing device shown in the accompanying drawings may be located in an orientation different from an orientation illustrated in the accompanying drawings, and the directional directives may be interpreted accordingly.

Hereinafter, embodiments will be described with reference to the accompanying drawings. In the accompanying drawings, the same reference numerals are assigned to the same or corresponding components. Further, in the following descriptions of the embodiments, a duplicate description on the same or corresponding components may be omitted. However, even though a description on a component is omitted, such a component is not intended to be excluded in any embodiment.

The embodiments described below and the examples shown in the accompanying drawings relate to a wheel bearing sealing device (hereinafter, simply referred as a sealing device). The sealing device according to the embodiments may be used for sealing a wheel bearing for a driving wheel or for sealing a wheel bearing for a driven wheel.

With reference to FIG. 1, an example of a sealing device according to one embodiment and a wheel bearing to which such a sealing device may be applied is illustrated.

A sealing device 100 comprises a first insert body 101 and a second insert body 102 which have an annular shape based on a rotation axis A. The first insert body 101 comprises a first frame 110 having an annular shape based on the rotation axis A, and a first sealing part 120 coupled to the first frame 110 in a circumferential direction D1 of the rotation axis A. The second insert body 102 comprises a second frame 130 having an annular shape based on the rotation axis A, and a second sealing part 140 coupled to the second frame 130 in the circumferential direction D1 of the rotation axis A. The second frame 130 of the second insert body 102 has a diameter that is smaller than that of the first frame 110.

According to one embodiment, the second insert body 102 may rotate relative to the first insert body 101 about the rotation axis A. Further, the first insert body 101 and the second insert body 102 are arranged such that centers of the annular shapes thereof are located on the same rotation axis A. According to the example shown in FIG. 1, the first insert body 101 is arranged to be spaced apart from the second insert body 102 in a radially outward direction D2. Accordingly, the first insert body 101 and the second insert body 102 form a gap 150 therewithin. In particular, the first insert body 101 and the second insert body 102 form the gap 150, which extends between the first sealing part 120 and the second sealing part 140 in the form of an annular shape based on the rotation axis A, between the first sealing part 120 and the second sealing part 140. The sealing device 100 blocks foreign materials such as rainwater, sewage, and the like, which are introduced into the gap 150, due to a complementary shape formed in each of the first sealing part 120 and the second sealing part 140.

The sealing device 100 of one embodiment may be inserted into a wheel bearing for a vehicle. The wheel bearing may comprise two members arranged on the same rotation axis and having a generally cylindrical shape, and a plurality of rolling elements arranged between the two members in the circumferential direction. One of the two cylindrical members may be rotated relative to the other member about the rotation axis. Alternatively, the two cylindrical members may be rotated relative to each other about the rotation axis.

With reference to the example shown in FIG. 1, the wheel bearing may comprise a cylindrical outer ring 210, a cylindrical inner ring 220 located in the outer ring 210, a cylindrical wheel hub 230 to which the inner ring 220 is fixed, and a plurality of rolling elements 240 arranged between an inner circumferential surface 211 of the outer ring 210 and an outer circumferential surface 221 of the inner ring 220 in the circumferential direction D1 and configured to rotate or roll. The outer ring 210 may be fixed to a portion of a chassis of the vehicle. An outer circumferential surface of the wheel hub 230 is interference fitted in an inner circumferential surface of the inner ring 220 so that the inner ring 220 may be fixed to the wheel hub 230. The wheel hub 230 may be coupled to a driving axle or a driven axle of the chassis to be rotated relative to the outer ring 210 together with the inner ring 220. In the example shown in FIG. 1, the rolling elements 240 are metal balls, but the rolling elements 240 are not limited to the metal ball.

According to the example shown in FIG. 1, the wheel bearing comprises an annular gap 250 which is formed between the inner circumferential surface 211 of the outer ring 210 and the outer circumferential surface 221 of the inner ring 220 and in which the rolling elements 240 are arranged. The first insert body 101 and the second insert body 102 are fitted in the gap 250 so that the sealing device 100 may be coupled to the wheel bearing. An outer circumferential surface of the first insert body 101 (e.g., an outer circumferential surface of the first frame 110) is interference fitted in the inner circumferential surface 211 of the outer ring 210 so that the first insert body 101 is coupled to the inner circumferential surface 211 of the outer ring 210. An inner circumferential surface of the second insert body 102 (e.g., an inner circumferential surface of the second frame 130) is interference fitted on the outer circumferential surface 221 of the inner ring 220 so that the second insert body 102 is coupled to the outer circumferential surface 221 of the inner ring 220. Accordingly, the second insert body 102 may be rotated relative to the first insert body 101 about the rotation axis A together with rotations of the wheel hub 230 and the inner ring 220.

In FIG. 1, the sealing device 100 is arranged at an end portion of the wheel bearing in a first axial direction D4 (a direction from the wheel toward the chassis along the rotation axis A). The second sealing part 140 may be arranged such that an end surface thereof in the first axial direction D4 and an edge of the first frame 110 in the first axial direction D4 are located on a line perpendicular to the rotation axis A. Alternatively, the sealing device 100 may be arranged at an end portion of the wheel bearing in a second axial direction D5 (a direction opposite to the first axial direction D4 along the rotation axis A). In such an example, the rolling elements 240 may be arranged between an inner circumferential surface of the outer ring 210 and an outer circumferential surface of the wheel hub 230, and the second insert body 102 may be coupled to the outer circumferential surface of the wheel hub 230 by interference fit.

The sealing device 100 according to one embodiment will be described in detail with reference to FIGS. 2 to 4.

The first frame 110 has an annular shape, and a center of the annular shape is located on the rotation axis A. The second frame 130 has an annular shape, and a center of the annular shape is located on the rotation axis A. As shown in FIGS. 2 and 3, the first frame 110 and the second frame 130 have an approximately L-shaped cross-sectional shape (a cross-sectional shape taken along the rotation axis A). The first frame 110 and the second frame 130 may be made of a metal material or a plastic material.

The first frame 110 has a length that is longer than that of the second frame 130 in the first axial direction D4 (or the second axial direction D5) and also in the radially outward direction D2. The first frame 110 comprises an annular cylindrical portion 111, an annular inclined portion 112 which is bent from an edge of the cylindrical portion 111 toward the rotation axis A, and an annular disc portion 113 which is bent from an edge of inclined portion 112 to extend in the radially inward direction D1. The cylindrical portion 111 is fitted in the inner circumferential surface 211 of the outer ring 210, such that an outer circumferential surface of the cylindrical portion 111, which is toward the radially outward direction D2 and extends in the circumferential direction D1, is fitted in the inner circumferential surface 211 of the outer ring 210 (see FIG. 1). An end portion 114 of the disc portion 113 in the radially inward direction D3 is offset with respect to the other portions of the disc portion 113 along the rotation axis A.

The second frame 130 comprises an annular cylindrical portion 131 and an annular disc portion 132 which is bent from an edge of the cylindrical portion 131 to extend in the radially outward direction D2. The cylindrical portion 131 is fitted on the outer circumferential surface 221 of the inner ring 220, such that an inner circumferential surface of the cylindrical portion 131, which is toward the radially inward direction D3 and extends in the circumferential direction D1, is fitted on the outer circumferential surface 221 of the inner ring 220 (see FIG. 1). The second frame 130 has a diameter that is smaller than that of the first frame 110. Specifically, a diameter of the disc portion 132 is smaller than that of the disc portion 113. Further, the second frame 130 has a length that is shorter than that of the first frame 110 in the first axial direction D4 (or in the second axial direction D5) and also in the radially outward direction D2. For example, the length of the cylindrical portion 131 in the first axial direction D4 is shorter than lengths of the cylindrical portion 111 and the inclined portion 112 in the first axial direction D4, and the length of the disc portion 132 in the radially outward direction D2 is shorter than lengths of the inclined portion 112 and the disc portion 113 in the radially outward direction D2.

The first sealing part 120 is integrally coupled to the first frame 110 along the first frame 110 in the circumferential direction D1. The second sealing part 140 is integrally coupled to the second frame 130 along the second frame 130 in the circumferential direction D1. According to the example shown in FIGS. 2 and 3, the first sealing part 120 is coupled to the first frame 110 along an entirety of the inclined portion 112 and an entirety of the disc portion 113. The second sealing part 140 is coupled to the second frame 130 along an entirety of the disc portion 132. The first sealing part 120 and the second sealing part 140 may be made of a rubber material or a plastic material. For example, the first sealing part 120 and the first frame 110, and the second sealing part 140 and the second frame 130 may be respectively coupled by adhesion. Alternatively, a material forming the first sealing part 120 is molded together with the first frame 110 such that the first insert body 101 may be manufactured, and a material forming the second sealing part 140 is molded together with the second frame 130 such that the second insert body 102 may be manufactured.

In the sealing device of the embodiments, the first insert body 101 and the second insert body 102 are arranged such that a gap 150 is formed between the first sealing part 120 and the second sealing part 140. That is, owing to the gap 150, the first sealing part 120 and the second sealing part 140 are positioned in a non-contact state. Accordingly, when the second insert body 102 is rotated together with rotations of the wheel hub 230 and the inner ring 220 of the wheel bearing (see FIG. 1), the first sealing part 120 does not come into contact with the second sealing part 140. Thus, the sealing device 100 may prevent contact and friction between a pair of sealing parts.

In addition, the sealing device 100 of the embodiments gradationally blocks foreign materials infiltrating into the gap 250 (see FIG. 1) between the outer ring and the inner ring and minimizes an infiltration amount of the foreign materials such that the gap 250 is sealed with high reliability. In the sealing device 100 of one embodiment, in order to minimize the infiltration of the foreign materials, the gap 150 between the first insert body 101 and the second insert body 102 has a labyrinth shape for preventing the infiltration of the foreign materials. Further, the sealing device 100 of one embodiment comprises one or more annular cavities in the labyrinth-shaped gap 150 to gradationally block foreign materials by the cavities. According to one embodiment, the first sealing part 120 and the second sealing part 140 are formed to define the labyrinth-shaped gap 150 and the cavities between the first insert body 101 and the second insert body 102.

In one embodiment, the first sealing part 120 and the second sealing part 140 are formed to define a first cavity 151, which has an annular shape based on the rotation axis A, and a second cavity 153, which is spaced apart from the first cavity 151 and has an annular shape based on the rotation axis A, in the gap 150 between the first sealing part 120 and the second sealing part 140. Further, the first sealing part 120 and the second sealing part 140 are formed such that a first cavity passage 152 having one end connected to the first cavity 151, the other end connected to the second cavity 153, and an annular shape based on the rotation axis A is defined in the gap 150.

In one embodiment, the second sealing part 140 comprises a first surface 145 facing the first sealing part 120 and a first baffle 146 protruding from the first surface 145. The first surface 145 and the first baffle 146 have an annular shape based on the rotation axis A. The first surface 145 is spaced apart from the second frame 130 in the first axial direction D4. The first baffle 146 protrudes from an end of the first surface 145 in the radially outward direction D2 toward the first sealing part 120.

Figure 2:
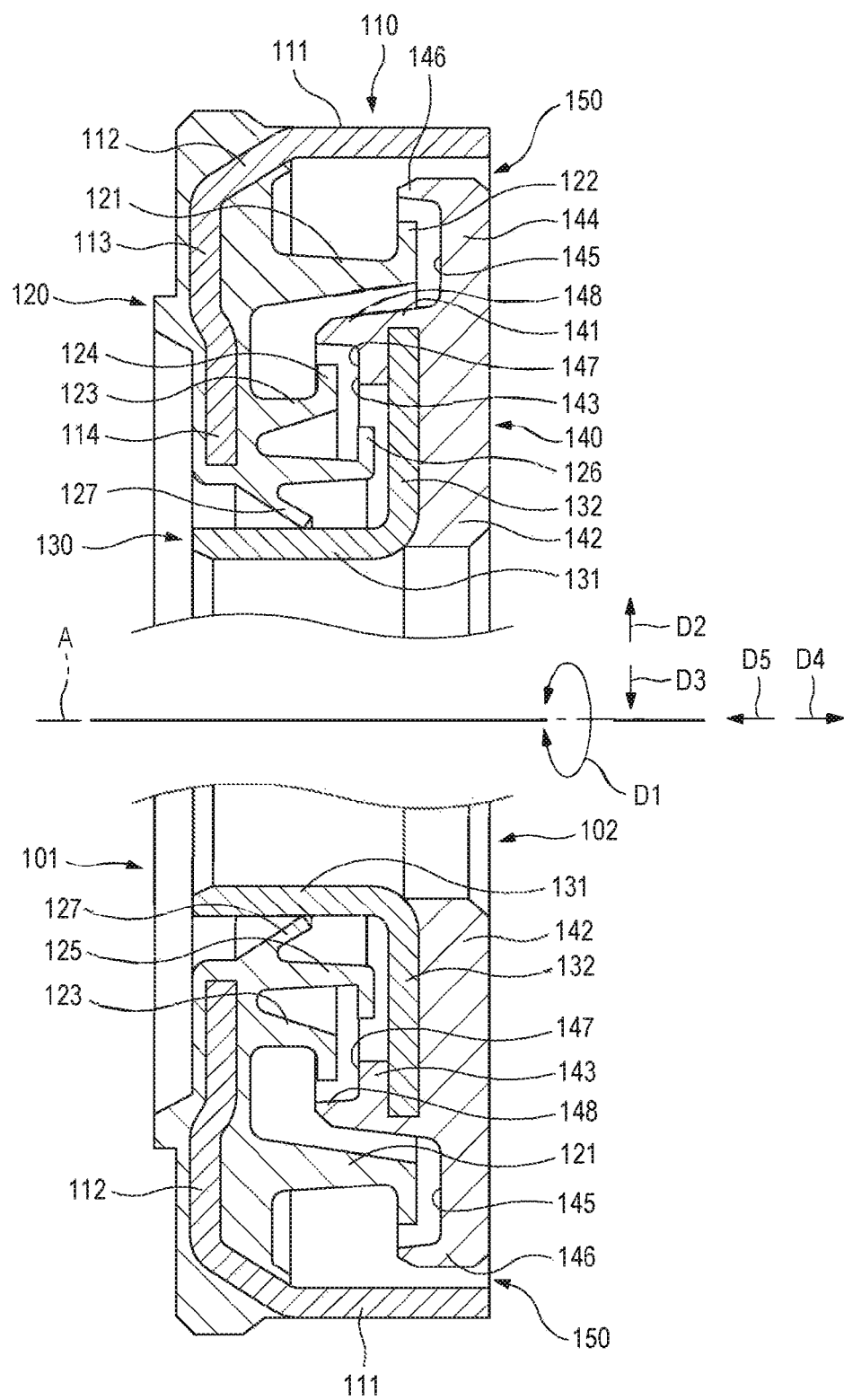
FIG. 2 is a side view illustrating a cross section of the wheel bearing sealing device according to one embodiment taken along a rotation axis.
Figure 3:
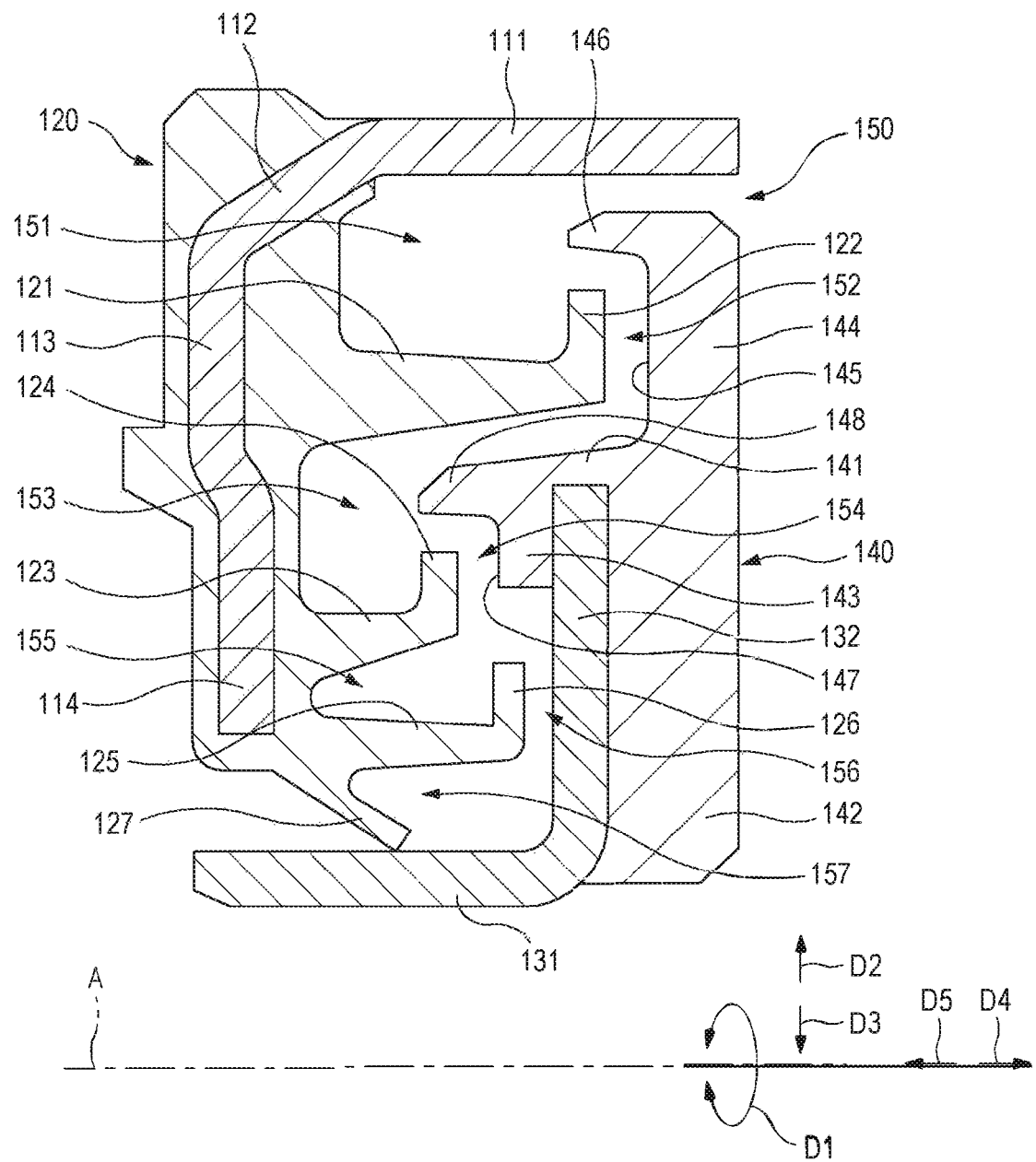
FIG. 3 illustrates a cross-sectional structure of the wheel bearing sealing device according to one embodiment taken along the rotation axis.

In the example shown in FIGS. 2 and 3, the second sealing part 140 comprises a cylindrical portion 141 located in the radially outward direction D2 than a free end of the disc portion 132 and having an annular shape based on the rotation axis A, a first disc portion 142 protruding from an end of the cylindrical portion 141 in the first axial direction D4 toward the radially inward direction D3 and having an annular shape based on the rotation axis A, and a second disc portion 143 protruding from an end of the cylindrical portion 141 in the second axial direction D5 toward the radially inward direction D3 and having an annular shape based on the rotation axis A. An inner diameter of the first disc portion 142 is smaller than that of the second disc portion 143, and the disc portion 132 of the second frame 130 is fitted between the first disc portion 142 and the second disc portion 143. Further, the second sealing part 140 comprises a flange 144 protruding from the first disc portion 142 in the radially outward direction D2 and having an annular shape based on the rotation axis A. In the example shown in FIGS. 2 and 3, the first surface 145 is an annular surface of the flange 144 in the second axial direction D5. The first surface 145 is spaced apart from the disc portion 132 in the first axial direction D4. The first baffle 146 protrudes from an end of the first surface 145 in the radially outward direction D2, i.e., from an end of the flange 144 in the radially outward direction D2, in the second axial direction D5. The first baffle 146 may be integrally formed with the second sealing part 140. For example, the first baffle 146 may be integrally formed of the same material with the flange 144. The surface of the first disc portion 142 in the first axial direction D4 is located coplanar with the surface of the flange 144 in the first axial direction D4. Further, the surfaces of the first disc portion 142 and the flange 144 in the first axial direction D4 and the edge of the cylindrical portion 111 in the first axial direction D4 are located on an imaginary vertical line perpendicular to the rotation axis A.

In one embodiment, the first cavity 151 is formed in the gap 150 by the first sealing part 120 and the first baffle 146. In connection with the first cavity 151 of the gap 150, the first sealing part 120 comprises an annular first lip 121 protruding toward the second sealing part 140 in the first axial direction D4. The first lip 121 is spaced apart from the inner circumferential surface of the cylindrical portion 111 and the second sealing part 140. Further, the first lip 121 may be curved or bent so as to partially define the first cavity 151. In the example shown in FIGS. 2 and 3, the first lip 121 comprises a first lip baffle 122 extending along a free end thereof and having an annular shape based on the rotation axis A. The first lip baffle 122 partially defines the first cavity 151. The first lip baffle 122 is oriented in the radially outward direction D2 and protrudes perpendicular to the rotation axis A of the second insert body 102.

In one embodiment, the first baffle 146 is spaced apart from the first lip baffle 122. A free end of the first baffle 146 is spaced from the first lip baffle 122 in the radially outward direction D2. Accordingly, the first cavity 151 is formed in the gap 150 by the first baffle 146 and the first sealing part 120, specifically, by the first baffle 146, the first lip 121, and the first lip baffle 122. Further, a free end of the first lip baffle 122 and the free end of the first baffle 146 define one end of the first cavity passage 152. In the example shown in FIGS. 2 and 3, the first cavity 151 is defined by the inner circumferential surface of the cylindrical portion 111, a peripheral surface of the first sealing part 120 in the first axial direction D4, a peripheral surface of the first lip 121 in the radially outward direction D2, a peripheral surface of the first lip baffle 122 in the second axial direction D5, and the first baffle 146. Alternatively, the free end of the first baffle 146 may be spaced apart from the first lip baffle 122 in the first axial direction D4 or the second axial direction D5.

The second cavity 153 is separated from the first cavity 151 by the first lip 121 and is located in the radially inward direction D3 of the first cavity 151. The second cavity 153 communicates with the first cavity 151 through the first cavity passage 152. In one embodiment, at least a portion of the first cavity passage 152 is formed in the gap 150 by the first sealing part 120, and the first surface and the first baffle 146 of the second sealing part 140. Further, the first cavity passage 152 is formed in the gap 150 by the first lip 121 and the second sealing part 140. Further, the first cavity passage 152 is bent with respect to the rotation axis A so that a cross-sectional shape thereof (a cross-sectional shape taken along the rotation axis A) has an approximately L-shape. According to the example shown in FIGS. 2 and 3, the first cavity passage 152 is formed in the gap 150 by a peripheral surface in the first axial direction D4 and the free end of the first lip baffle 122, a portion of a peripheral surface of the first lip 121 in the radially inward direction D3, a peripheral surface of the first baffle 146 in the radially inward direction D3, the first surface 145, and a peripheral surface of the cylindrical portion 141. One end of the first cavity passage 152, which is connected to the first cavity 151, and the other end of the first cavity passage 152, which is connected to the second cavity 153, are spaced apart from each other in the radially outward direction D2 and also along the rotation axis A.

In one embodiment, in connection with the second cavity 153, the second sealing part 140 comprises a second surface 147 facing the first sealing part 120 and a second baffle 148 protruding from the second surface 147. The second surface 147 and the second baffle 148 have an annular shape based on the rotation axis A. The second surface 147 is spaced apart from the first surface 145 in the radially inward direction D3 and the second axial direction D5. The second baffle 148 protrudes from an end of the second surface 147 in the radially outward direction D2 toward the first sealing part 120. The second cavity 153 is formed in the gap 150 by the first sealing part 120 and the second baffle 148.

In the example shown in FIGS. 2 and 3, the second surface 147 is a surface of the second disc portion 143 in the second axial direction D5. The second baffle 148 protrudes from the cylindrical portion 141 in the second axial direction D5 and extends from the cylindrical portion 141 to be coplanar with the cylindrical portion 141. The second baffle 148 is spaced apart from the second lip baffle 124. A free end of the second baffle 148 is spaced apart from the second lip baffle 124 in the radially outward direction D2 and faces the second cavity 153. The second baffle 148 may be integrally formed with the second sealing part 140. For example, the second baffle 148 may be integrally formed of the same material with the cylindrical portion 141.

In one embodiment, in connection with the second cavity 153, the first sealing part 120 comprises a second lip 123 spaced apart from the first lip 121 in the radially inward direction D3 and having an annular shape based on the rotation axis A. The second lip 123 may protrude toward the second sealing part 140 and may be curved or bent so as to partially define the second cavity 153. In the example shown in FIGS. 2 and 3, the second lip 123 comprises a second lip baffle 124 extending along a free end thereof and having an annular shape based on the rotation axis A. The second lip baffle 124 is oriented in the radially outward direction D2 and protrudes perpendicular to the rotation axis A. Thus, the second lip baffle 124 partially defines the second cavity 153. The free end of the second baffle 148 is spaced from the second lip baffle 124 in the radially outward direction D2. Accordingly, the free end of the second baffle 148 defines the other end of the first cavity passage 152. In the example shown in FIGS. 2 and 3, the second cavity 153 is defined by a peripheral surface of the first lip 121 in the radially inward direction D3, a peripheral surface of the first sealing part 120 in the first axial direction D4, a peripheral surface of the second lip 123 in the radially outward direction D2, a peripheral surface of the second lip baffle 124 in the second axial direction D5, and the second baffle 148. Alternatively, the free end of the second baffle 148 may be spaced apart from the second lip baffle 124 in the first axial direction D4 or the second axial direction D5.

In one embodiment, the sealing device 100 comprises a second cavity passage 154 and a third cavity 155, which communicates with the second cavity 153 through the second cavity passage 154, in the gap 150 between the first sealing part 120 and the second sealing part 140. The first sealing part 120 and the second sealing part 140 are formed to define the second cavity passage 154 and the third cavity 155 in the gap 150. One end of the second cavity passage 154 is connected to the second cavity 153, the other end thereof is connected to the third cavity 155, and the second cavity passage 154 has an annular shape based on the rotation axis A. The third cavity 155 is spaced apart from the second cavity 153 and is connected to the other end of the second cavity passage 154. The third cavity 155 has an annular shape based on the rotation axis A. According to the example shown in FIGS. 2 and 3, the third cavity 155 is spaced apart from the second cavity 153 in the radially inward direction D3 and the first axial direction D4. In addition, one end of the second cavity passage 154 is spaced apart from the other end thereof along the rotation axis A, and the other end of the second cavity passage 154 is spaced apart from the one end thereof in the radially inward direction D3.

In one embodiment, the first sealing part 120 comprises a third lip 125 spaced apart from the second lip 123 in the radially inward direction D3 and having an annular shape based on the rotation axis A. The third lip 125 may protrude toward the second sealing part 140 and may be curved or bent so as to partially define the third cavity 155. In the example shown in FIGS. 2 and 3, the third lip 125 has a length that is longer than that of the second lip 123. The third lip 125 comprises a third lip baffle 126 extending along a free end thereof and having an annular shape about the rotation axis A. The third lip baffle 126 partially defines the third cavity 155. The third lip baffle 126 is oriented in the radially outward direction D2 and protrudes perpendicular to the rotation axis A.

In the example shown in FIGS. 2 and 3, a free end of the second disc portion 143 is spaced from the third lip baffle 126 in the radially outward direction D2 to define the other end of the second cavity passage 154. Thus, the third cavity 155 is defined by a peripheral surface of the second lip 123 in the radially inward direction D3, a peripheral surface of the first sealing part 120 in the first axial direction D4, a peripheral surface of the third lip 125 in the radially outward direction D2, a peripheral surface of the third lip baffle 126 in the second axial direction D5, and the free end of the second disc portion 143. Alternatively, the free end of the second disc portion 143 may be spaced apart from the third lip baffle 126 in the first axial direction D4 or the second axial direction D5.

In the example shown in FIGS. 2 and 3, the third cavity 155 is separated from the second cavity 153 through the second lip 123. The second cavity passage 154 has a approximately L-shaped cross-sectional shape (a cross-sectional shape taken along the rotation axis A) and is bent with respect to the rotation axis A. An orientation of the second cavity passage 154 is different from that of the first cavity passage 152 by as much as about 90 degrees. In one embodiment, at least a portion of the second cavity passage 154 is formed in the gap 150 by the first sealing part 120, the second baffle 148, and the second surface 147. In the example shown in FIGS. 2 and 3, the second cavity passage 154 is formed by a peripheral surface of the second lip baffle 124 in the first axial direction D4, a peripheral surface of the second baffle 148 in the radially inward direction D3, and the second surface 147.

In one embodiment, the sealing device 100 comprises a fourth cavity 157, which communicates with the third cavity 155 and has an annular shape based on the rotation axis A, between the first sealing part 120 and the second frame 130. The first sealing part 120 is formed such that the fourth cavity 157 is defined between the first sealing part 120 and the second frame 130. According to the example shown in FIGS. 2 and 3, the fourth cavity 157 is spaced apart from the third cavity 155 in the radially inward direction D3 and the first axial direction D4. The first sealing part 120 comprises a grease lip 127 protruding toward the second frame 130 and having an annular shape based on the rotation axis A. For example, the grease lip 127 may prevent leakage of grease which is filled in the gap 250 (see FIG. 1) between the outer ring 210 and the inner ring 220 and lubricates the rolling elements 240 (see FIG. 1). A free end of the grease lip 127 may come into contact with the outer circumferential surface of the second frame 130 of the second insert body 102. Further, the grease may be applied between the free end of the grease lip 127 and the cylindrical portion 131.

According to the example shown in FIGS. 2 and 3, the grease lip 127 protrudes from a fixed end of the third lip 125 in an oblique direction between the radially inward direction D3 and the first axial direction D4. The fourth cavity 157 is formed by a peripheral surface of the third lip 125 in the radially inward direction D3, a peripheral surface of the disc portion 132 in the second axial direction D5, a peripheral surface of the cylindrical portion 131 in the radially outward direction D2, and the grease lip 127. That is, the grease lip 127 partially defines the fourth cavity 157.

In one embodiment, the fourth cavity 157 is separated from the third cavity 155 through the third lip 125 and communicates with the third cavity 155 through a third cavity passage 156. The third cavity passage 156 is connected to the third cavity 155 and has an annular shape based on the rotation axis A. The third cavity passage 156 has a generally L-shaped cross-sectional shape (a cross-sectional shape taken along the rotation axis A) and is bent with respect to the rotation axis A. The third cavity passage 156 may be formed in the gap 150 by the first sealing part 120, the second sealing part 140, and the second frame 130. In the example shown in FIGS. 2 and 3, an orientation of the third cavity passage 156 is the same as that of the second cavity passage 154. The third cavity passage 156 is defined by a peripheral surface of the third lip baffle 126 in the first axial direction D4, the free end of the second disc portion 143, and the peripheral surface of the disc portion 132 in the second axial direction D5.

According to the example shown in FIGS. 2 and 3, a volume of an annular space formed by the first cavity 151 is larger than that of an annular space formed by the second cavity 153. The volume of the annular space formed by the second cavity 153 is larger than that of an annular space formed by the third cavity 155. The first cavity passage 152 and the second cavity passage 154 have a cross-sectional shape which is bent in an L-shape based on the rotation axis A and have different orientations. Further, the first cavity 151, the second cavity 153, and the third cavity 155 are arranged at different positions along the rotation axis A. The first cavity 151, the first cavity passage 152, the second cavity 153, the second cavity passage 154, and the third cavity 155, which have the above-described arrangement, define a labyrinth-shaped gap 150 for preventing infiltration of foreign materials.

Figure 4:
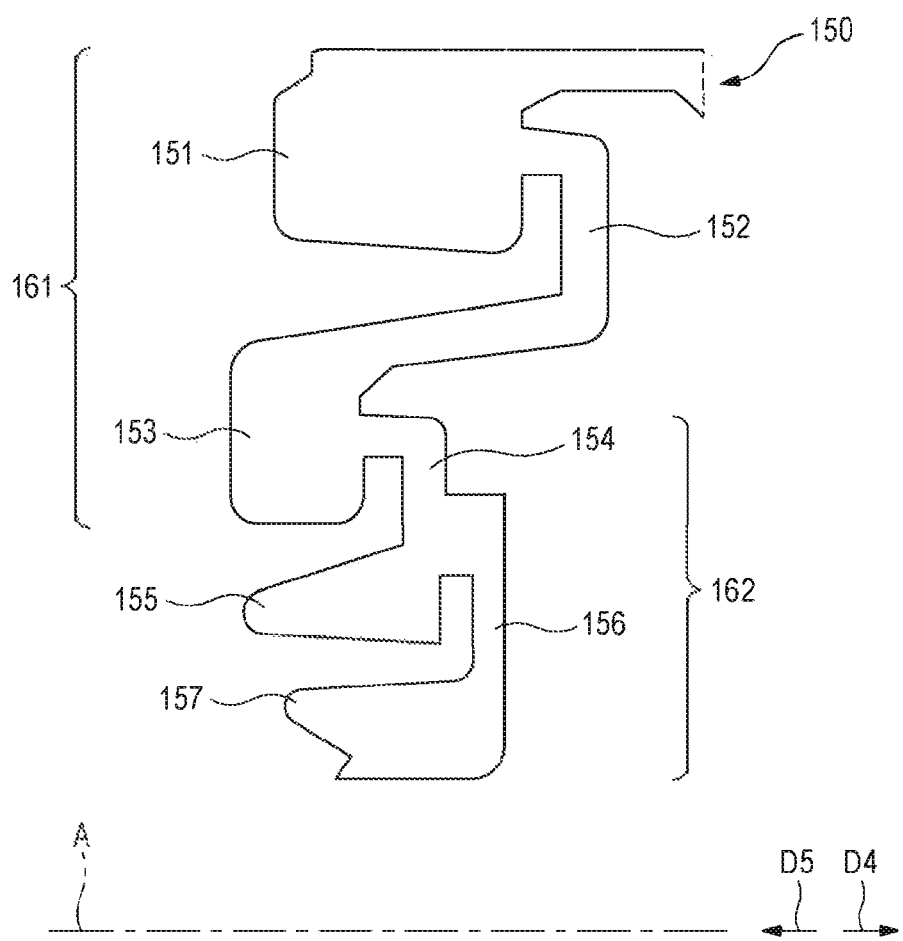
FIG. 4 is a schematic diagram illustrating a cross-sectional structure of a labyrinth-shaped gap defined between a first sealing part and a second sealing part according to one embodiment.

FIG. 4 illustrates an example of the labyrinth-shaped gap 150 defined by the first sealing part and the second sealing part. With reference to FIGS. 2 to 4, an example of a sealing operation of the sealing device 100 will be described.

According to the example shown in FIGS. 3 and 4, a first labyrinth part 161 comprised of the first cavity 151, the first cavity passage 152, and the second cavity 153 is formed in the gap 150 by the first lip 121, the first lip baffle 122, the first surface 145, the first baffle 146, the cylindrical portion 141, the second lip 123, the second lip baffle 124, and the second baffle 148. The first labyrinth part 161 has a generally U-shaped cross-sectional shape (a cross-sectional shape taken along rotation axis A). Foreign materials infiltrating into an inlet of the gap 150 (e.g., between the edge of the cylindrical portion 111 in the first axial direction D4 and an edge of the flange 144) may be accumulated or held in the first cavity 151. Foreign materials which are not accommodated in the first cavity 151 may flow into the second cavity 153 through a U-shaped passage of the first labyrinth part 161. However, owing to the shape of the first cavity passage 152, infiltration rates of the foreign materials may be reduced. The foreign materials having the reduced infiltration rates may be accumulated or held in the second cavity 153.

Therefore, it is difficult that the foreign materials infiltrate into the gap 250 (see FIG. 1) of the wheel bearing through the gap 150. The foreign materials flowing into the gap 150 are accumulated or held in the first cavity 151 or the second cavity 153, and thus the sealing device 100 gradationally blocks infiltration of the foreign materials and minimizes an infiltration amount of the foreign materials. Further, the first lip baffle 122 and the second lip baffle 124, which protrude perpendicular to the rotation axis A, may prevent an overflow of the foreign materials. Accordingly, owing to the labyrinth structure in the gap 150, the sealing device 100 can seal the gap 250 (see FIG. 1) of the wheel bearing with high reliability.

Further, according to the examples shown in FIGS. 3 and 4, a second labyrinth part 162 defined by the second cavity passage 154, the third cavity 155, the third cavity passage 156, and the fourth cavity 157 is formed in the gap 150. The second labyrinth part 162 is connected to the first labyrinth part 161 and has a cross-sectional shape (a cross-sectional shape taken along rotation axis A) and an orientation different from those of the first labyrinth part 161. The foreign materials which are not accommodated in the second cavity 153 may be blocked by the third cavity 155 or the fourth cavity 157. Further, the third lip baffle 126 protruding perpendicular to the rotation axis A may prevent an overflow of the foreign materials in the third cavity 155. Accordingly, the sealing device 100 can prevent the foreign materials from infiltrating into the gap 250 (see FIG. 1) of the wheel bearing with high reliability.

The sealing device 100 shown in FIGS. 2 to 4 comprises the first to fourth cavities 151, 153, 155, and 157, and adjacent cavities among the first to fourth cavities 151, 153, 155, and 157 communicate with each other. A sealing device of another embodiment may comprise an additional cavity in addition to the above-described cavities. In such an embodiment, in order to define the additional cavity, each of the first sealing part 120 and the second sealing part 140 may comprise an additional lip and an additional baffle.

Figure 5:
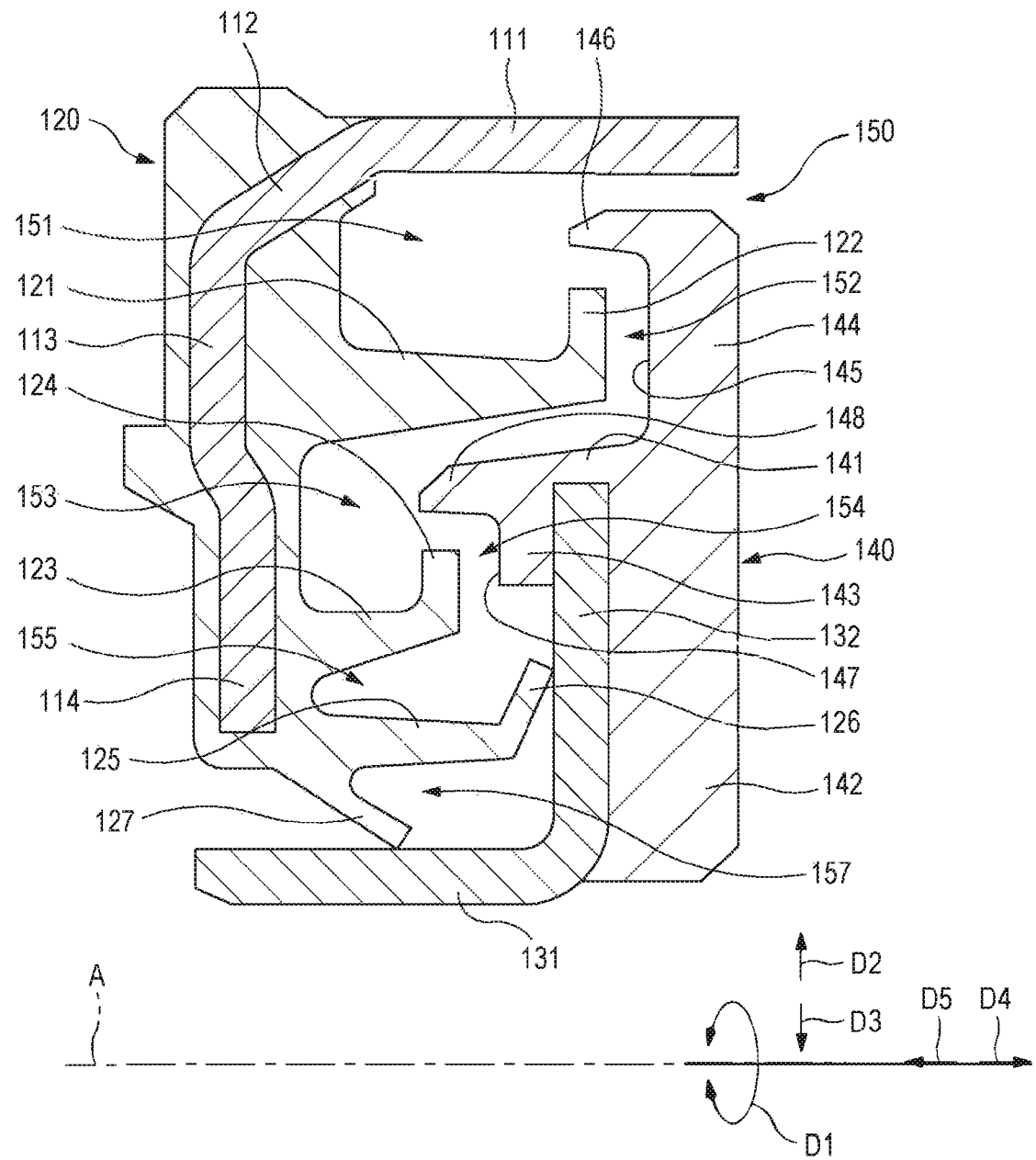
FIG. 5 illustrates a cross-sectional structure of the wheel bearing sealing device that shows another example of a third lip of the first sealing part.

In the above-described embodiment, the third lip 125 is spaced apart from the second insert body 102 to define the third cavity passage 156 therebetween. Alternatively, the third lip 125 may be in contact with the second insert body 102. For example, according to the example shown in FIG. 5, the third lip 125 may be in contact with a surface of the disc portion 132 in the second axial direction D5 at a free end of the third lip baffle 126 to improve sealing performance. Further, grease may be applied between the free end of the third lip baffle 126 and the disc portion 132.

Figure 6:
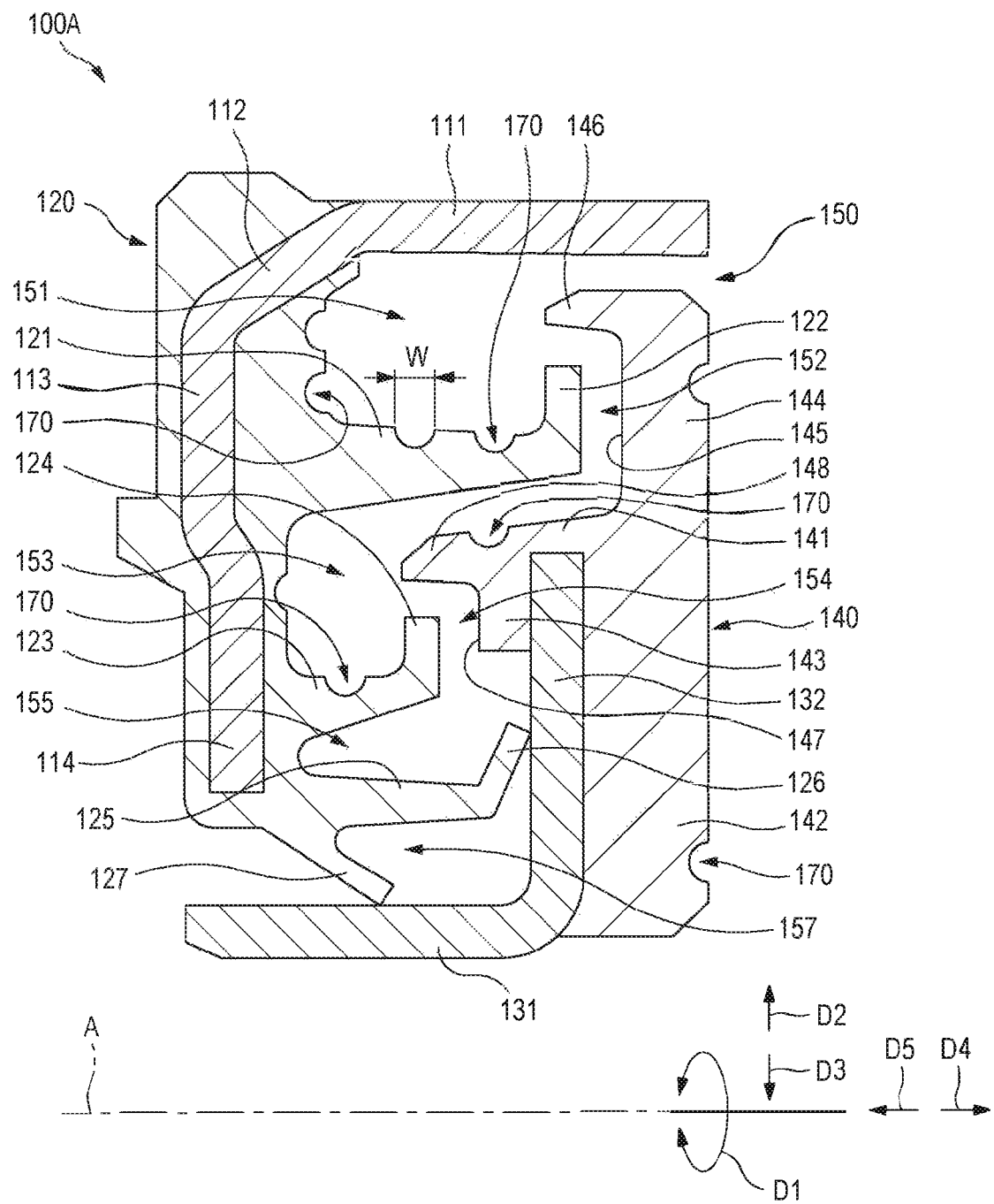
FIG. 6 illustrates a cross-sectional structure of a wheel bearing sealing device according to another embodiment.

The sealing device according to the embodiments may comprise a plurality of grooves for reducing infiltration rates of the foreign materials. FIG. 6 illustrates a cross-sectional shape of the sealing device according to such embodiments.

With Reference to FIG. 6, a sealing device 100A according to another embodiment comprises a plurality of grooves 170. The groove 170 extends in the circumferential direction D1 of the rotation axis A and has an annular shape based on the rotation axis A. The position of the grooves 170 shown in FIG. 6 is merely illustrative.

The sealing device 100A may comprise the groove 170 in a portion of the gap 150, which may hold infiltrating foreign materials. According to the example shown in FIG. 6, the first sealing part 120 comprises the groove 170 on the surface facing the first cavity 151 (e.g., the peripheral surface of the first sealing part 120 in the first axial direction D4 and the surface of the first lip 121 in the radially outward direction D2). Further, the first sealing part 120 comprises the groove 170 on the surface facing the second cavity 153 (e.g., the peripheral surface of the first sealing part 120 in the first axial direction D4 and the surface of the second lip 123 in the radially outward direction D2).

The foreign materials infiltrating into the first cavity 151 may come into contact with a surface of the groove 170. The groove 170 may reduce the rates of the foreign materials and may hold a small amount of the foreign materials therein. Thus, the foreign materials may be congested in the first cavity 151 and may be held in the first cavity 151 and also in the groove 170. Foreign materials which are not held in the first cavity 151 may infiltrate into the second cavity 153 through the first cavity passage 152. The groove 170 located in the second cavity 153 may reduce the rates of the foreign materials and, the foreign materials may be congested in the second cavity 153 and may be held in the second cavity 153 and also in the groove 170. Alternatively, the first sealing part 120 may comprise the groove 170 on only the surface facing the first cavity 151.

The sealing device 100A may not comprise the groove 170 in a portion of the gap 150 in which the foreign materials may flow. According to the example shown in FIG. 6, the groove 170 is not provided on the first cavity passage 152, the surface of first lip 121 in the radially inward direction D3, the second cavity passage 154, and the surface of the second lip 123 in the radially inward direction D3. Further, the surface of the first lip 121 in the radially inward direction D3 and the surface of the second lip 123 in the radially inward direction D3 comprise a flat surface with no irregular shape. When the second insert body is rotated, the foreign materials may be discharged in the radially outward direction D2 due to a centrifugal force of the rotation. Since the surface of the first lip 121 in the radially inward direction D3 and the surface of the second lip 123 in the radially inward direction D3 comprise the flat surface with no irregular shape, the discharged foreign materials may be easily discharged along the surface of the first lip 121 in the radially inward direction D3 or the surface of the second lip 123 in the radially inward direction D3 toward the radially outward direction D2 and the first axial direction D4. When the second insert body is not rotated, the foreign material flows downward along the surface of the first lip 121 in the radially inward direction D3 or the surface of the second lip 123 in the radially inward direction D3 and the foreign materials may be easily discharged along the surface of the second lip 123 in the radially inward direction D3 or the surface of the first lip 121 in the radially inward direction D3 toward the radially outward direction D2 and the first axial direction D4.

Adjacent grooves 170 may be spaced apart from each other along the rotation axis A or in the radially outward direction D2 by a flat or curved surface having an annular shape based on the rotation axis A. A width W of the groove 170 may exceed 0.1 mm. An upper limit of the width W of the groove 170 may be determined such that the adjacent grooves 170 may be spaced apart from each other by the flat or curved surface within the length of the lip of the first sealing part 120 (e.g., the first lip 121 and the second lip) along the rotation axis A. When the width W of the groove 170 exceeds 0.1 mm, the groove 170 may appropriately hold foreign materials therein. As shown in FIG. 6, a cross-sectional shape of the groove 170 may have a semi-circular shape but is not limited thereto. The cross-sectional shape of the groove 170 may have a polygonal shape such as a triangular shape, a quadrangular shape and the like. Further, as shown in FIG. 6, the second sealing part 140 comprises the groove 170 on the surface of the first disc portion 142 in the first axial direction D4 and the surface of the flange 144 in the first axial direction D4.

As still another embodiment, the second sealing part of the second insert body may have a magnetic property. With reference to FIG. 7, a second sealing part 140 of a sealing device 100B according to still another embodiment may provide a magnetic signal to a sensor 260 which may be installed in the wheel bearing. The sensor 260 may comprise a wheel speed sensor capable of measuring a wheel speed. In order to generate the magnetic signal, a portion of the second sealing part 140 comprises a magnetic material. That is, the second sealing part 140 may be formed of a rubber material and a magnetic material or may be formed of a plastic material and a magnetic material. For example, in the example shown in FIG. 7, a flange 144 of the second sealing part 140 may comprise the magnetic material. As the second insert body is rotated about the rotation axis A, a magnetic field generated due to the magnetic property of the flange 144 may be varied, and the sensor 260 may detect the variation in magnetic field. The flange 144 has a thickness that the sensor 260 is capable of detecting the variation in magnetic field. That is, a minimum thickness of the flange 144 in the first axial direction D4 is determined such that the sensor 260 is capable of detecting the variation in magnetic field. Alternatively, a annular member having a magnetic property may be attached to the surface of the second sealing part 140 of the first axial direction D4.

As a modification of the above-described embodiments, a first sealing part 120 may comprise the first surface 145, the first baffle 146, the second surface 147, and the second baffle 148 which are described above, and a second sealing part 140 may comprise the first lip 121, the first lip baffle 122, the second lip 123, the second lip baffle 124, the third lip 125, and the third lip baffle 126 which are described above.

Although the technical spirit of the present disclosure has been described by way of some embodiments and examples shown in the accompanying drawings, it should be noted that various substitutions, modification, and alterations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A wheel bearing sealing device, comprising:
a first insert body comprising an annular first frame and a first sealing part coupled to the first frame; and
a second insert body comprising an annular second frame having a diameter that is smaller than that of the first frame and a second sealing part coupled to the second frame, wherein
the second insert body rotates relative to the first insert body,
the first sealing part comprises an annular first lip protruding toward the second sealing part,
the second sealing part comprises a first surface facing the first sealing part and spaced apart from the second frame in a first axial direction; a first baffle protruding from the second sealing part toward the first sealing part; and a second baffle protruding from the second sealing part toward the first sealing part and spaced apart from the first baffle in a radially inward direction,
a first cavity is formed in a gap between the first sealing part and the second sealing part by the first sealing part and the first baffle,
at least a portion of a first cavity passage connected to the first cavity is formed in the gap between the first sealing part and the second sealing part by the first sealing part, the first baffle and the first surface,
the second sealing part is formed of a magnetic material,
the second frame comprises a cylindrical portion and a disc portion bent from an edge of the cylindrical portion to extend in a radially outward direction,
a radially outward end portion of the disc portion of the second frame is spaced apart from an end portion of the first lip in the radially inward direction,
the end portion of the first lip is radially disposed between the first baffle and the second baffle,
the first sealing part further comprises a contact sealing lip protruding toward the disc portion of the second frame such that an end portion of the contact sealing lip is in contact with the disc portion of the second frame, and
a grease is applied between the end portion of the contact sealing lip and the disc portion of the second frame.

2. A wheel bearing sealing device, comprising:
a first insert body comprising an annular first frame and a first sealing part coupled to the first frame; and
a second insert body comprising an annular second frame having a diameter that is smaller than that of the first frame and a second sealing part coupled to the second frame, wherein
the second insert body rotates relative to the first insert body,
the second sealing part comprises a first surface facing the first sealing part and spaced apart from the second frame in a first axial direction; and a first baffle protruding from the second sealing part toward the first sealing part,
a first cavity is formed in a gap between the first sealing part and the second sealing part by the first sealing part and the first baffle, and
at least a portion of a first cavity passage connected to the first cavity is formed in the gap between the first sealing part and the second sealing part by the first sealing part, the first baffle, and the first surface,
the second sealing part comprises:
a second surface facing the first sealing part and spaced apart from the first surface in a second axial direction opposite to the first axial direction; and
a second baffle protruding from the second sealing part toward the first sealing part,
wherein a second cavity is formed in the gap between the first sealing part and the second sealing part by the first sealing part and the second baffle, and
at least a portion of a second cavity passage connected to the second cavity is formed in the gap between the first sealing part and the second sealing part by the first sealing part, the second baffle and the second surface.

3. The wheel bearing sealing device of claim 2, wherein a volume of the first cavity is larger than that of the second cavity.

4. The wheel bearing sealing device of claim 2, wherein the first cavity passage and the second cavity passage have a cross-sectional shape which is bent with respect to a rotation axis of the second insert body.

5. The wheel bearing sealing device of claim 2, wherein:
the first sealing part comprises an annular first lip protruding toward the second sealing part and configured to partially define the first cavity, and
the first cavity passage is formed in the gap between the first sealing part and the second sealing part by the first lip and the second sealing part.

6. The wheel bearing sealing device of claim 5, wherein:
the first lip comprises an annular first lip baffle configured to partially define the first cavity, and
the first lip baffle protrudes perpendicular to a rotation axis of the second insert body.

7. The wheel bearing sealing device of claim 6, wherein a free end of the first baffle is spaced apart from the first lip baffle in the radially outward direction.

8. The wheel bearing sealing device of claim 6, wherein:
the first sealing part comprises a second lip protruding toward the second sealing part, and
the second lip is spaced from the first lip in a radially inward direction to partially define the second cavity.

9. The wheel bearing sealing device of claim 8, wherein:
the second lip comprises an annular second lip baffle configured to partially define the second cavity, and
the second lip baffle protrudes perpendicular to the rotation axis of the second insert body.

10. The wheel bearing sealing device of claim 9, wherein a free end of the second baffle is spaced apart from the second lip baffle in the radially outward direction.

11. The wheel bearing sealing device of claim 9, wherein:
a third cavity connected to the second cavity through the second cavity passage is formed in the gap between the first sealing part and the second sealing part,
the first sealing part comprises a third lip spaced apart from the second lip in the radially inward direction, protruding toward the second sealing part, and configured to partially define the third cavity, and
the third lip is in contact with the second insert body.

12. The wheel bearing sealing device of claim 9, wherein:
a third cavity is formed in the gap between the first sealing part and the second sealing part by the first sealing part and the second sealing part, and
a third cavity passage connected to the third cavity is formed in the gap between the first sealing part and the second sealing part by the first sealing part, the second sealing part and the second frame.

13. The wheel bearing sealing device of claim 12, wherein:
the first sealing part comprises a third lip protruding toward the second sealing part, and
the third lip is spaced from the second lip in the radially inward direction to partially define the third cavity.

14. The wheel bearing sealing device of claim 13, wherein:
the third lip comprises an annular third lip baffle configured to partially define the third cavity, and
the third lip baffle protrudes perpendicular to the rotation axis of the second insert body.

15. The wheel bearing sealing device of claim 14, wherein:
the first sealing part comprises a grease lip in contact with an outer circumferential surface of the second frame,
the third lip and the grease lip partially define a fourth cavity communicating with the third cavity, and
the fourth cavity has an annular shape.

16. The wheel bearing sealing device of claim 12, wherein the first cavity, the second cavity, and the third cavity are arranged at different positions in the radially inward direction.

17. The wheel bearing sealing device of claim 12, wherein the first cavity passage, the second cavity passage, and the third cavity passage have a cross-sectional shape which is bent with respect to the rotation axis of the second insert body.

18. A wheel bearing sealing device, comprising:
a first insert body comprising an annular first frame and a first sealing part coupled to the first frame; and
a second insert body comprising an annular second frame having a diameter that is smaller than that of the first frame and a second sealing part coupled to the second frame, wherein
the second insert body rotates relative to the first insert body,
the second sealing part comprises a first surface facing the first sealing part and spaced apart from the second frame in a first axial direction; and a first baffle protruding from the second sealing part toward the first sealing part,
a first cavity is formed in a gap between the first sealing part and the second sealing part by the first sealing part and the first baffle, and
at least a portion of a first cavity passage connected to the first cavity is formed in the gap between the first sealing part and the second sealing part by the first sealing part, the first baffle, and the first surface,
the first sealing part has a plurality of grooves on the surface facing the first cavity, and
the plurality of grooves have an annular shape based on the rotation axis and are spaced apart from each other.

* * * * *